United States Patent
Evans et al.

(10) Patent No.: US 8,493,619 B2
(45) Date of Patent: Jul. 23, 2013

(54) HARDWARE-ACCELERATED COLOR DATA PROCESSING

(75) Inventors: Glenn F. Evans, Kirkland, WA (US);
Benjamin Ellett, Kirkland, WA (US);
David R. Blythe, Kirkland, WA (US);
Anantha R. Kancherla, Redmond, WA (US); Bradley P. Gibson, Seattle, WA (US); Michael D. Stokes, Eagle, ID (US); Steven James White, Seattle, WA (US); Denis Demandolx, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 85 days.

(21) Appl. No.: 13/208,751

(22) Filed: Aug. 12, 2011

(65) Prior Publication Data

US 2011/0298819 A1   Dec. 8, 2011

Related U.S. Application Data

(62) Division of application No. 11/203,740, filed on Aug. 15, 2005.

(51) Int. Cl.
*G09G 5/02* (2006.01)
*G06F 15/00* (2006.01)

(52) U.S. Cl.
USPC ............ 358/1.9; 358/519; 358/523; 358/501; 358/535; 358/518; 382/162; 345/600; 345/603

(58) Field of Classification Search
USPC ................... 358/1.9, 519; 382/162; 345/600, 345/603
See application file for complete search history.

(56) References Cited

U.S. PATENT DOCUMENTS

| | | | | |
|---|---|---|---|---|
| 5,537,638 A | * | 7/1996 | Morita et al. | 345/426 |
| 6,459,425 B1 | * | 10/2002 | Holub et al. | 345/207 |
| 2002/0165881 A1 | * | 11/2002 | Shelton | 707/526 |
| 2002/0181000 A1 | * | 12/2002 | Fukasawa et al. | 358/1.9 |
| 2003/0016862 A1 | * | 1/2003 | Ohga | 382/162 |
| 2003/0234793 A1 | * | 12/2003 | Stokes et al. | 345/600 |

* cited by examiner

*Primary Examiner* — Steven Kau
*Assistant Examiner* — Quang N Vo
(74) *Attorney, Agent, or Firm* — Shook Hardy & Bacon LLP

(57) ABSTRACT

Methods for mapping color data having at least one color associated therewith to an output device based on an input-device profile and an output-device profile, each profile having a tone curve and a color matrix, are provided. In one embodiment, the method includes receiving color data from an input device and determining whether the color data is in a linear space. If it is determined that the color data is not in a linear space, the method further includes applying the tone curve of the input device profile to the color data to convert it into a linear space. The method further includes converting the color(s) associated with the color data from the input linear space to an output linear space by applying the color matrix of the input device profile and the inverse color matrix of the output device profile to create color-converted image data.

6 Claims, 4 Drawing Sheets

HARDWARE-ACCELERATED COLOR DATA PROCESSING

CROSS-REFERENCE TO RELATED APPLICATIONS

This application is a divisional application of U.S. application Ser. No. 11/203,740, which was filed on Aug. 15, 2005.

BACKGROUND

Color management systems attempt to compensate for the different color capabilities of devices, viewing conditions, and subjective preferences. Different devices interpret and reproduce color differently and are often referred to as having disparate color capabilities. In particular, each device has a limited range of colors (e.g., as represented by lightness, chroma, and hue) that the device may detect and/or produce. This limited range is often referred to as the device color gamut. As a result of different device color capabilities, color data may appear visually different when displayed on two separate devices. For instance, a document displayed on a monitor may appear visually different when displayed on a different monitor or printed on a printer. Further, it should be noted that as opposed to being associated with an actual device, color data may be associated with a virtual device, such as stored on disk in a file format representative of a virtual device (e.g., sRGB) that has associated color characteristics, for example. Accordingly, as used herein, the term "device" may refer to either an actual device or a virtual device.

In order to compensate for the different color capabilities of devices, color management systems may apply color transformations to color data in order to map the colors from a source device to a destination device, typically using profiles for each device that describe parameters, such as native device capabilities, viewing conditions, and subjective preferences. The profiles associated with each device may either implicitly or explicitly set forth each of these parameters.

A key component of color management is the conversion of color data from the profile associated with one device (e.g., an actual device such as a digital camera or a virtual device such as sRGB) to the profile associated with another device (e.g., a monitor or other display). That is, color management attempts to ensure that a desired reproduction of the color data derived from a source device is output on a destination device. As more fully described below, such color management conversions are generally based on a color profile associated with the source device and a color profile associated with the destination device, each of which includes a tone curve and a color matrix, and are computationally intensive.

One current approach to color management is profile management. The most common implementation of this approach is the International Color Consortium (ICC) standard. Under this approach, each device has a profile that characterizes the relationship between the device capabilities and the human visual system as described by a non-linear ICC profile connection space (PCS). Color transformations between devices may be created using the device color profiles. The color transformation may then be applied to convert color data between the devices. When utilizing the profile management approach, the tone curve and the color matrix associated with the device are typically confounded and hard coded into a color profile that is associated with the device itself.

Additionally, color data processing, e.g., photographic image processing, is generally performed utilizing a Central Processing Unit (CPU). While CPUs can effectively process color data in most instances, such processing is typically rather slow leading to user frustration and overall dissatisfaction with the color data processing application.

BRIEF SUMMARY

Embodiments of the present invention relate to a color management model which can exploit a color engine (e.g., a Color Management Module (CMM)) associated with a Central Processing Unit (CPU) to set up an accelerated Graphics Processing Unit (GPU) color management pipeline. In this way, a user experiences no significant reduction in performance or quality upon the mapping of color data, e.g., image data or media content, derived from a source device to their destination device.

More particularly, embodiments of the present invention relate to the creation of novel color transforms from the color profile associated with a source device to the color profile associated with a destination device. Further, embodiments of the present invention relate to the ability to coordinate hardware acceleration for the color transforms between a CPU, a GPU, and a Micro-Processing Unit (MPU). Embodiments of the present invention further relate to a custom hardware acceleration structure which is optimized for a GPU and is compatible with video Digital to Analog Converters (videoDACs) and MPUs in displays. For instance, when operating in a dual-monitor system, a custom color transform may be provided which separates the color management calculations into two stages to support the destination device color profiles of the two monitors, possibly splitting the common functionality into the GPU and separate functionality in combinations of videoDACs and MPUs in the separate displays.

This summary is provided to introduce a selection of concepts in a simplified form that are further described below in the Detailed Description. This summary is not intended to identify key feature or essential features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

Figure 1:
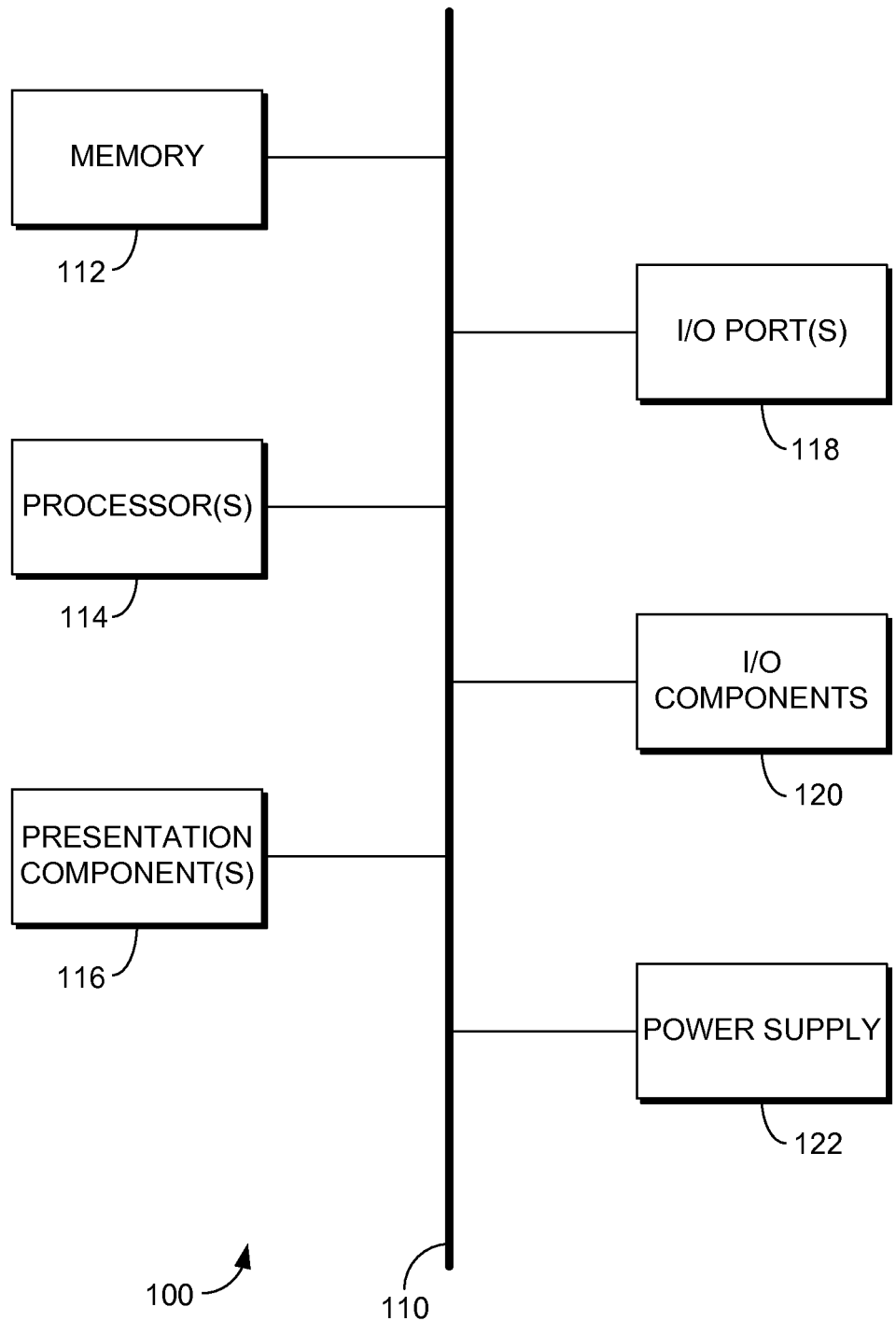
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide methods for mapping color data, e.g., image data or media content, having at least one color associated therewith to an output device based on an input device profile and an output device profile, each of the input device profile and the output device profile having a tone curve and a color matrix. In one embodiment, the method includes receiving color data from an input device and determining whether the input color data is in a linear space. If it is determined that the input color data is not in a linear space, the method further comprises applying the tone curve of the input device profile to the input color data to convert the color data into an input linear space. The method further comprises converting the color(s) associated with the color data from the input linear space to an output linear space by applying the color matrix of the input device profile and the inverse color matrix of the output device profile thereto to create color-converted color data, and mapping the inverse tone curve of the output device profile into the color-converted color data to convert the color-converted color data into mapped image data. In one embodiment, the method may further include outputting the mapped color data to the output device.

Further embodiments of the present invention provide methods for accelerating color data processing utilizing a Central Processing Unit (CPU) having at least one Color Management Module (CMM) associated therewith and a Graphics Processing Unit (GPU). In one embodiment, the method includes receiving an input device profile and an output device profile, determining a tone curve and a color matrix of both the input device profile and the output device profile, and providing the tone curve and the color matrix of the input device profile and the output device profile to the GPU, wherein the GPU is capable of mapping color data having at least one color associated therewith from the input device profile to the output device profile utilizing the tone curve and the color matrix of the input and output device profiles. In one embodiment, determining the tone curve and the color matrix of both the input device profile and the output device profile includes querying the CMM of the CPU for the desired information.

Additional embodiments of the present invention provide computer readable media having computer-executable instructions for performing the methods herein described, as well as computers programmed to perform the described methods.

Still further embodiments of the present invention provide systems for accelerated processing of color data having at least one color associated therewith based on an input device profile and an output device profile, each of the input device profile and the output device profile having a tone curve and a color matrix. In one embodiment, the system includes a GPU, one or more video Digital to Analog Converters (videoDACs), or any combination thereof; a tone curve receiving component; a color matrix receiving component; and a color conversion component. The tone curve receiving component is for receiving the tone curve of one or both of the input device profile and the output device profile. The color matrix receiving component is for receiving the color matrix of one or both of the input device profile and the output device profile. The color conversion component is for converting the color(s) of the color data from the color matrix of the input device profile to the color matrix of the output device profile. In one embodiment, the system further includes an outputting component for outputting mapped color data to the output device.

Having briefly described an overview of embodiments of the present invention, an exemplary operating environment for the present invention is described below.

Exemplary Operating Environment

Referring to the drawings in generally and initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, and the like. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device 100 that may be used in connection with one or more embodiments of the present invention.

Computing device 100 typically includes a variety of computer-readable media. By way of example, and not limitation, computer-readable media may include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, and carrier wave or any other medium that can be used to encode desired information and be accessed by computing device 100.

Memory 112 includes computer-storage media in the form of non-transitory and tangible media, which comprises volatile and/or nonvolatile memory. The memory may be removable, non-removable, or a combination thereof. Exemplary hardware devices include solid-state memory, hard drives, optical-disc drives, and the like. Computing device 100 includes one or more processors that read data from various entities such as memory 112 or I/O component(s) 120. Presentation component(s) 116 present data indications to a user or other device. Exemplary presentation components include a display device, speaker, printing component, vibrating component, and the like.

I/O port(s) 118 allow computing device 100 to be logically coupled to other devices including I/O component(s) 120, some of which may be built in. Illustrative components include a microphone, joystick, game pad, satellite dish, scanner, printer, wireless device, and the like.

Hardware-Accelerated Color Data Processing

As previously mentioned, embodiments of the present invention relate to methods for mapping color data (for instance, color data derived from image data or media content) from a color profile associated with a source device, e.g., an actual device such as a digital camera or a virtual device such as sRGB, to a color profile associated with an output or destination device, e.g., a monitor or other display. The terms "media content" and "image data" are utilized interchangeably herein and refer to any data or content which a user may visually perceive. By way of example only, and not limitation, media content/image data may include a photograph, a video, or anything viewable on a user's desktop (e.g., windows, borders, tiles, buttons, and the like).

Processing of color data utilizing, at least in part, a Graphics Processing Unit (GPU) instead of a Central Processing Unit (CPU), as contemplated by the present invention, can provide a user with a very high-speed, high-performance editing experience which is interactive and of superior quality. It will be understood and appreciated by those of ordinary skill in the art that the methods herein described are not limited to GPU processing and may include, in whole or in part, processing in a CPU, videoDAC, MPU, or the like. All such variations, and any combination thereof, are contemplated within the scope of the present invention.

As will be understood by those of ordinary skill in the art, the last step in color data processing is to map one or more colors associated with the input media content for the output or destination device (e.g., monitor) based on a device-specific color profile, that is, a description of the color-related capabilities of the output device. By way of example only, if a user wishes to view media content received from a digital camera on a laptop computer monitor, the Red-Green-Blue (RGB) color combinations for every pixel on the screen must be mapped to a set of color-representative numbers that are specific to the laptop monitor to get a true and accurate color reproduction on the monitor.

As previously mentioned, such color conversions have traditionally been performed utilizing a CPU with some occasional corrections performed by the videoDACs which may or may not be part of the GPU. The videoDAC typically encompasses the optimized per pixel conversion or transformation functionality in the display circuitry. It is desirable to transfer as much computation to the videoDAC as possible to help to reduce the workload on the upstream GPU or CPU components. However, when processing color data utilizing a GPU (at least in part), it may be desirable to permit the color data to remain in the GPU once transferred thereto rather than having to transfer such data out of the GPU for color conversion in the CPU and subsequently returning the color-converted color data back to the GPU. This is particularly true with respect to color mapping of the color data as by the time this stage of processing is reached, the color data is essentially ready to be displayed, excepting the color conversions, and transferring it back to the CPU can greatly reduce the speed of performance.

As such, embodiments of the present invention provide a color management model which can exploit a color engine (e.g., a Color Management Module (CMM)) associated with a CPU to set up an accelerated GPU color management pipeline. In this way, a user experiences no significant reduction in performance or quality upon the mapping of color data, e.g., image data or media content, derived from a source device to their destination device.

Figure 2:
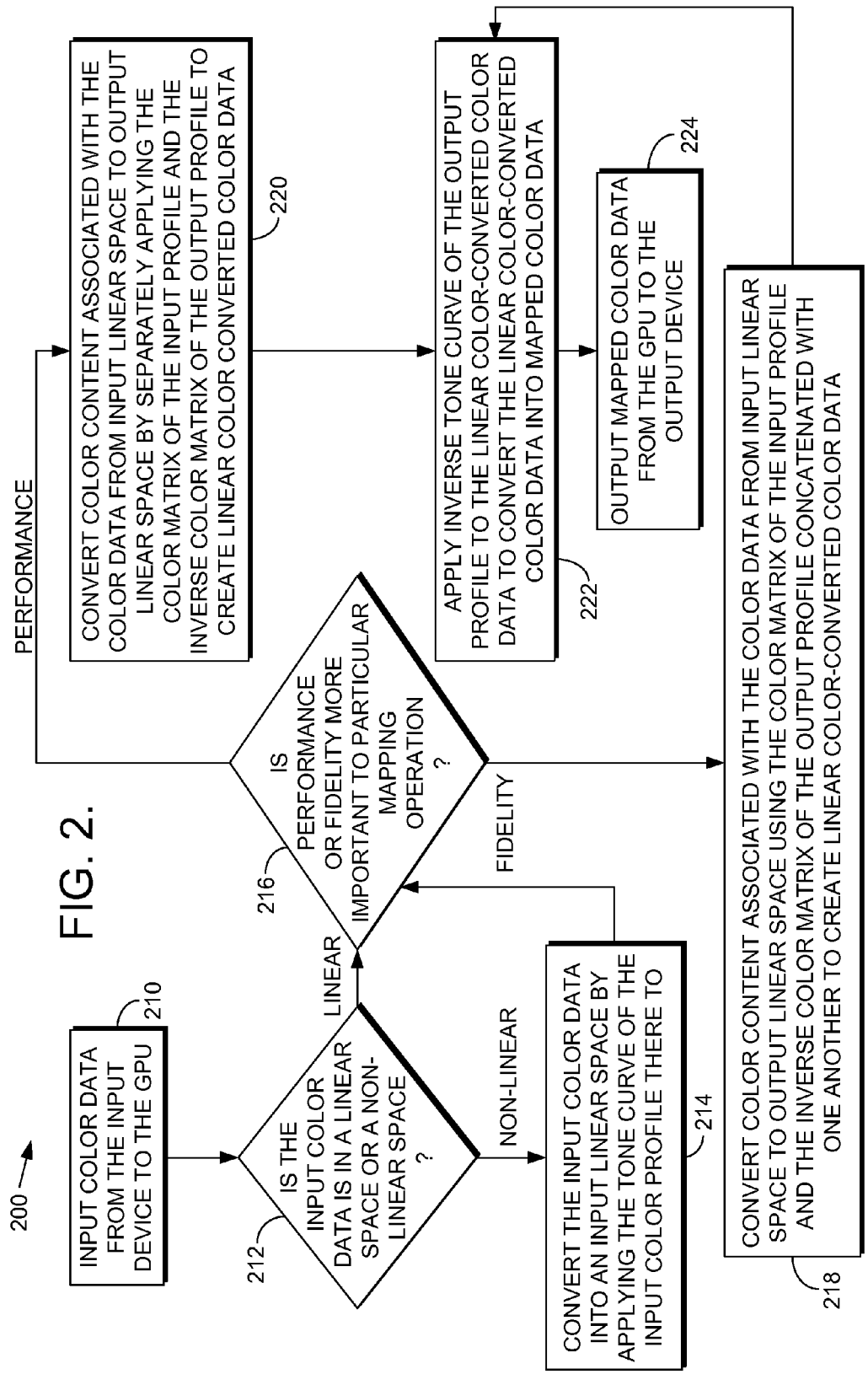
FIG. 2 is a flow diagram showing a method for mapping color data from an input device to an output device in accordance with an embodiment of the present invention.

Turning to FIG. 2, a flow diagram is illustrated which shows a method 200 for mapping color data from an input device to one or more output or destination devices based on an input device profile and an output device profile, in accordance with an embodiment of the present invention. Both the input and output device profiles includes a tone curve and a color matrix. A color matrix essentially rotates the primaries so that, for instance, the red of the color profile associated with one device, e.g., an input device, matches the red of the color profile associated with another device, e.g., an intermediate or destination device. Matrices are linearly mapped and, accordingly, color matrix conversions must be performed in a linear space or artifacts will result. Color matrix conversions are more fully described below with respect to blocks 218 and 220 of FIG. 2.

To understand the significance of tone curves and color matrices, it is beneficial to analogize to the human visual system. The sensitivity of the human visual system to changes in the brightness or energy of light does not have a one-to-one correspondence. That is, the human visual system's sensitivity to light isn't as great around bright areas as it is around darker areas. Thus, if a first light has a brightness equivalent to X and a second light has a brightness equivalent to 2X, a decrease in the sensitivity of the human visual response to the second light may cause the user to perceive the second light as brighter than the first light but not necessarily twice as bright. This decrease in sensitivity allows humans to respond to a very large range of visual phenomena.

Projectors, displays, and other output devices provide a similar adjustment in their respective color profiles, the adjustment being provided as the tone curve (or Tonal Response Curve (TRC)) and the color matrix. In this way, colors output on such devices enjoy a more accurate and realistic presentation than a one-to-one correspondence would provide.

Initially, as indicated at block 210, color data from the input device is input into the GPU. Subsequently, as indicated at block 212, it is determined whether the input color data is in a linear space or a non-linear space. As will be understood and appreciated by those of ordinary skill in the art, as used herein, the term "linear" refers to linear with respect to luminance. (In this regard, a "non-linear" space is often referred to as a "gamma" space.) As color conversion calculations are to be performed in a linear space to avoid artifacts, if it is determined at block 212 that the input color data is in a non-linear space, the color data is converted to a linear space associated with the input device, as indicated at block 214. Such conversion is accomplished by applying the tone curve of the color profile associated with the input device thereto.

Once the color data is converted to a linear space (or if the input color data is already in a linear space), it is determined if performance or fidelity is more important to the particular color mapping operation being performed. This is indicated at block 216. Such determinations may be made based on programmed algorithms and controlled as hard coded or may be based upon a user indication of a preference for performance or fidelity. All such variations, and any combination thereof, are contemplated to be within the scope of the present invention.

If it is determined that performance is more important to the particular color mapping operation being performed, the color content associated with the color data from the input linear space are converted to the output linear space using the color matrix of the input profile and the inverse color matrix of the output profile concatenated with one another, as indicated at block 218. Such conversion creates linear color-converted color data. Concatenating (or multiplying) the color matrix of the input profile and the inverse color matrix of the output profile with one another permits the performance of only a single color conversion operation rather than two separate operations and, accordingly, speeds performance of the color mapping operation being performed. Performance may be desired over fidelity if, for instance, it is desired to convert immediately from the input device to the output device without any additional graphics processing (e.g., scaling, antialiasing, and the like).

If, however, it is determined at block 216 that fidelity is more important to the particular color mapping operation being performed, the color content associated with the color data from the input linear space are converted to the output linear space by separately applying the color matrix of the input profile and the inverse color matrix of the output profile to create linear color-converted color data, as indicated at block 220. More particularly, the color data is first converted from the input linear space to an intermediate linear space by applying the color matrix of the input profile thereto. Subsequently, the color data is converted from the intermediate linear space to the output linear space by applying the color matrix of the output profile thereto. Finally, the inverse color matrix of the output profile is applied to create the color-converted color data.

Fidelity may be desired over performance if, for instance, additional graphics processing is desired and/or if the primaries of the input profile are the same (or nearly the same) as the primaries of the intermediate space in which additional graphics processing is desired. Such additional graphics processing is generally best performed in a linear space and, accordingly, in the workflow of this embodiment of the present invention, may be performed subsequent to the step indicated at block 212 (if it is determined that the input color data is in a linear space), subsequent to the step indicated at block 214 (if conversion of the input color data into a linear space is necessary), subsequent to the step indicated at block 218, in the intermediate linear space (that is, subsequent to application of the color matrix of the input profile but prior to the conversion to the output linear space), or subsequent to the step indicated at block 220 (that is, subsequent to application of the inverse output matrix). The determination of at what stage it is desired to perform such additional graphics processing may be made, at least in part, based upon the nature of the input, output, and intermediate spaces and the capabilities of the devices themselves.

With reference back to FIG. 2, once the color data has been converted to color-converted linear data by having the color matrix of the input profile and the inverse color matrix of the output profile applied thereto (whether or not concatenated with one another), the inverse or degenerated tone curve of the output profile is applied to the linear color-converted color data to convert such data into mapped color data. Such is indicated at block 222. Subsequently, as indicated at block 224, the mapped color data may be output to one or more output devices.

In one embodiment, it may be desirable to apply the inverse matrix of the output device and/or the inverse tone curve of the output device not in the GPU but actually in the MPU of the display itself. For instance, where there are multiple displays (or remote displays), each may have a different output profile. Where this is the case, application of the inverse matrix and/or inverse tone curve of the output device in the MPU optimizes performance.

In another embodiment, application of the inverse matrix of the output device and/or the inverse tone curve of the output device may be performed in a graphics card, that is, in an additional set of chips in the graphics card called video Digital to Analog Converters (videoDACs). VideoDACs are made up of at least a one-dimensional lookup table so they can apply the inverse tone curve of the output device and, in some cases, application of the inverse matrix as well. It may be desirable to perform such functions in the videoDACs if, for instance, the display(s) being utilized don't support that functionality. All such variations, and any combination thereof, are contemplated to be within the scope of embodiments of the present invention.

Additionally, in one embodiment, if it is desired to concatenate the matrix of the input device and the inverse matrix of the output device to avoid multiple matrix application performance hits, such processing may be performed in the GPU (as previously described), in the videoDACs (if supported), or in the MPU of a display (if supported) with minimal to no loss in fidelity (depending upon what the input profile is). All such variations, and any combination thereof, are contemplated to be within the scope of embodiments of the present invention.

In another embodiment, it may be desirable to determine if the input space and/or the output space are near-linear such that they could be combined with acceptable fidelity degradation with the other linearization step (or other tone curve). For instance, if the tone curve of the output profile is not quite linear but nearly linear, the inverse of the output tone curve may be combined with the tone curve of the input profile and applied to the color data. This would place the data in a nearly linear space. A judgment would have to be made in such an instance that the space is close enough to linear to be acceptable. The advantage of such a processing variation would be that only a single tone curve operation would have to be performed, and such operation may be performed on either the front end or on the back end. For instance, if the tone curve of the input profile was nearly linear, processing could be postponed through to the back end with the inverse tone curve of the output profile and the color conversion operations could, accordingly, be performed in a nearly linear space rather than in a linear space. Determinations as to the desirability of such an embodiment could be made based upon programmed algorithms which are controlled as hard coded or based upon a user preference of performance over fidelity.

Figure 3:
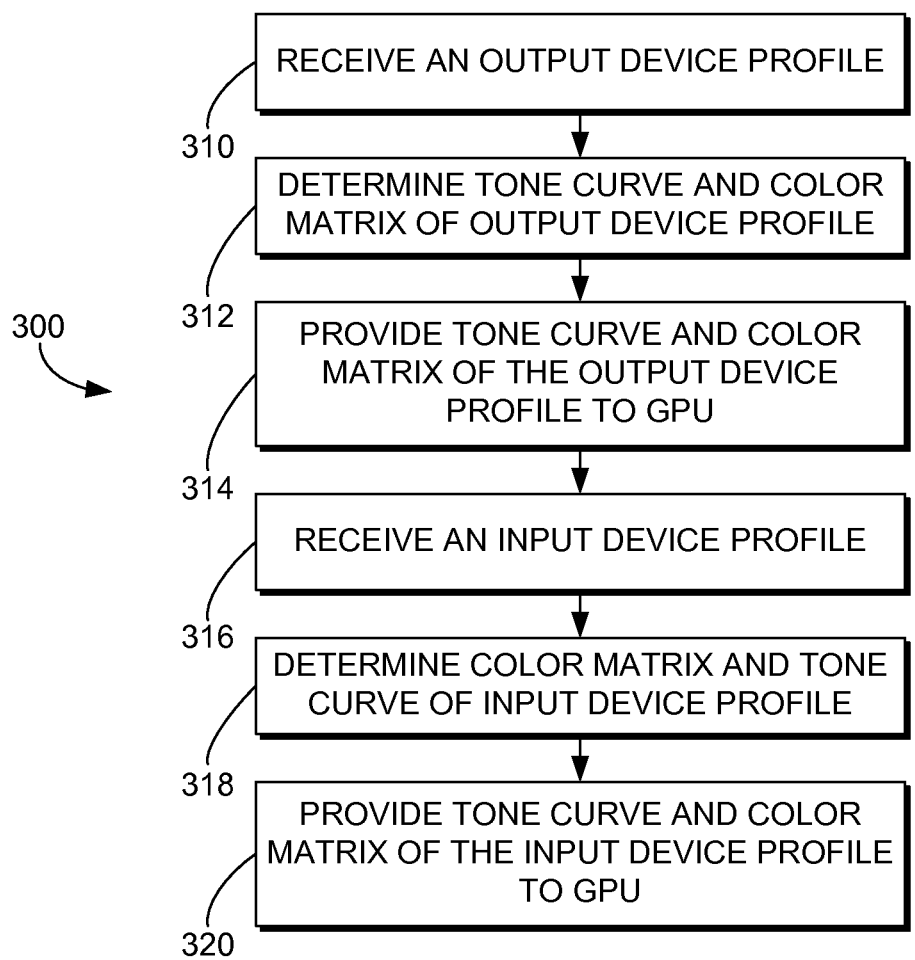
FIG. 3 is flow diagram showing a method for obtaining and providing information to a GPU for use in accelerated image processing in accordance with an embodiment of the present invention.

With reference to FIG. 3, a flow diagram is illustrated which shows a method 300 for obtaining and providing information to a GPU for use in accelerated color data processing, in accordance with an embodiment of the present invention. Initially, as indicated at block 310, an output device profile (having a tone curve and a color matrix) is received. In one embodiment, the output device profile may be received from one or more Image Color Management Application Programming Interfaces (ICM APIs). Such ICM APIs may be associated with a Color Management Module (CMM) associated with a Central Processing Unit (CPU). Each color channel forms a separate column in the color matrix and the color matrix specifies the transform from the color space to the CIE XYZ connection space. Additionally received as part of the output device profile are the current array lengths for the tone curve associated therewith, as well as the current parameters for the output device tone curve. The first n samples are returned for each of the red, green and blue color channels. The tone curve specifies the transform from the destination color space to a linear space.

Next, as indicated at block 312, the tone curve and the color matrix of the output device profile are determined. Such determination may be made by querying the CMM of the CPU for the desired information. Subsequently, the tone curve and color matrix of the output device profile are provided to the GPU, as indicated at block 314. The GPU is capable of mapping image data having one or more colors associated therewith to an output device profile utilizing the tone curve and the color matrix provided. By way of example only, and not limitation, the tone curve and the color matrix of the output device profile may be provided to the GPU in High Level Shader Language (HLSL).

In one embodiment, an inverse mapping for the tone curve and the color matrix may be determined and such inverse mapping provided to the GPU in addition to, or instead of, the tone curve and color matrix themselves. All such variations, and any combination thereof, are contemplated to be within the scope hereof.

Either before, after, or simultaneously with receipt of the output device profile, an input device profile (having at least a color matrix and a tone curve) is received. This is indicated at block 316. In one embodiment, the input device profile may be received from one or more ICM APIs. Such ICM APIs may be associated with the CMM. As with the destination profile, each color channel forms a separate column in the color matrix and the color matrix specifies the transform from the color space to the CIE XYZ connection space. Additionally received as part of the input device profile are the current array lengths for the tone curve associated therewith, as well as the current parameters for the input device tone curve.

In one embodiment, the input device profile may be received from the CMM associated with the CPU. Next, as indicated at block 318, the tone curve and the color matrix of the input device profile are determined. Such determination may be made by querying the CMM of the CPU for the desired information. Subsequently, the tone curve and the color matrix of the input device profile are provided to the GPU, as indicated at block 320. By way of example only, and not limitation, the tone curve and the color matrix of the input device profile may be provided to the GPU in High Level Shader Language (HLSL).

In one embodiment, an inverse mapping for the tone curve and the color matrix may be determined and such inverse mapping provided to the GPU in addition to, or instead of, the tone curve and color matrix themselves. All such variations, and any combination thereof, are contemplated to be within the scope hereof.

Once the tone curve and the color matrix (or inverse mappings thereof) of the output device profile and the tone curve and the color matrix (or inverse mappings thereof) of the input device profile have been provided to the GPU or videoDACs, accelerated processing of color data may be performed, for instance, as indicated in the flow diagram of FIG. 2.

As previously described, in one aspect, embodiments of the present invention provide for the coordination of a CPU, a GPU or videoDACs and, if desired, a Micro-Processing Unit MPU, as more fully described below with reference to FIG. 4. To ensure greater efficiency and thus improve speed and performance of image processing, it may be desirable to move one or more of the color conversion computations downstream, that is, away from the CPU and into the GPU or videoDACs and/or the MPU. One way in which such downstream delegation may be of particular desirability is when color data is being mapped to multiple output devices. For instance, if there are four output devices, the tone curve may be applied to the color data in the GPU or videoDACs converting the data into a linear space and then the linear data may be forwarded to multiple MPUs, each having information about the color matrix and the inverse of the tone curve of a particular output device associated therewith. Once the linear data is forwarded to the respective MPUs, the appropriate color conversions may be performed, the inverse tone curve associated with the output device for each of the respective output devices applied to the data, and then output to the output devices.

Figure 4:
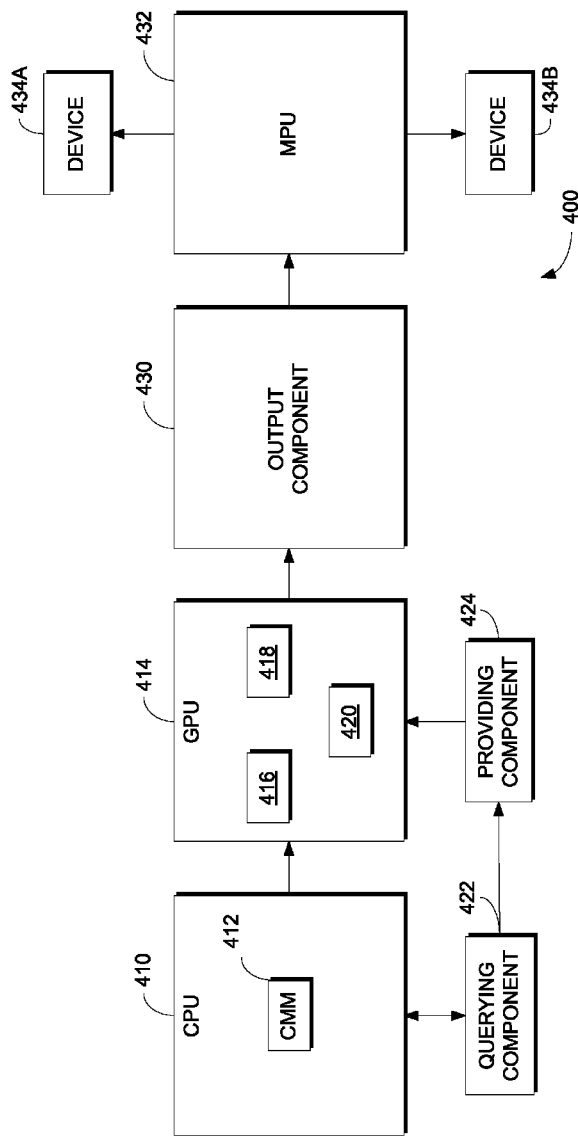
FIG. 4 is a block diagram of an exemplary system for accelerated processing of color data, e.g., image data or media content, based on an input device profile and an output device profile in accordance with an embodiment of the present invention.

Turning to FIG. 4, a block diagram is illustrated which shows an exemplary system 400 for accelerated processing of color data based on an input device profile and an output device profile (each having a tone curve and a color matrix), in accordance with an embodiment of the present invention. The system 400 includes a CPU 410 having a CMM 412 associated therewith. The system 400 further includes a GPU or videoDACs having a tone curve receiving component 416, a color matrix receiving component 418, and a color conversion component 420 associated therewith. The tone curve receiving component 416 is capable of receiving the tone curve (and/or inverse tone curve) of the input device profile and the output device profile. The color matrix receiving component 418 is capable of receiving the color matrix (and/or inverse color matrix) of the input device profile and the output device profile. The color conversion component 420 is capable of converting at least one color associated with color profile of the input device to the color matrix of the output device profile to create color-converted color data. For instance, in one embodiment, the color conversion component 420 is capable of multiplying the color matrix of input device profile and the inverse color matrix of the output device profile to convert one or more colors associated with the color data from the color matrix of the input device profile to the color matrix of the output device profile.

The system 400 additionally includes a querying component 422 that is capable of querying the CMM of the CPU to determine the tone curve (and/or inverse thereof) and the color matrix (and/or inverse thereof) of the output device profile, as well as the tone curve (and/or inverse thereof) and the color matrix (and/or inverse thereof) of the input device profile. Once the desired information is determined, it is provided to a providing component 424 that is capable of providing the tone curve (and/or inverse thereof) and the color matrix (and/or inverse thereof) of the output device profile and the tone curve (and/or inverse thereof) and the color matrix (and/or inverse thereof) of the input device profile to the GPU 414.

Once the GPU 414 (or videoDACs) has processed the color data received, the mapped color data may be provided to an output component 430 capable of outputting the mapped color data to one or more desired output devices. In one embodiment the mapped color data may be processed from the output component 430 to a MPU 432 prior to output to one or more output devices 434A, 434B. In another embodiment (not shown), the output component 430 may process the mapped color data directly to one or more output devices 434A, 434B without utilizing a MPU 432. Either embodiment, or any combination thereof is contemplated to be within the scope of the present invention.

As discussed hereinabove, at times it may be desirable to push one or more of the color management calculations further down the processing pipeline. As such, embodiments of the present invention contemplate that one or more of the tone curve receiving component 416, the color matrix receiving component 418, and the color matrix conversion component 420 may be present in the MPU 432 (or videoDACs (not shown)) in addition to or instead of being present in the GPU 414. In such embodiments, the functions performed by any component present in the MPU 432 (or videoDACs) may be performed at this later stage in the processing pipeline, if desired. All such variations, and any combinations thereof, are contemplated to be within the scope hereof.

As can be understood, embodiments of the present invention provide a color management model which can exploit a color engine (e.g., a Color Management Module (CMM)) associated with a Central Processing Unit (CPU) to set up an accelerated Graphics Processing Unit (GPU) (or video Digital to Analog Converter (videoDAC)) color management pipeline. In this way, a user experiences no significant reduction in performance or quality upon the mapping of color data, e.g., image data or media content, derived from a source device to a destination device.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for mapping color data, which has a color associated therewith, to an output device based on an input-device profile and an output-device profile, each of the input-device profile and the output-device profile having a tone curve and a color matrix, the method comprising:
    receiving by a processing unit color data from an input device;
    determining by the processing unit that the color data is not in a linear space;
    applying by the processing unit the tone curve of the input-device profile to the color data to convert the color data into an input linear space;
    determining whether performance considerations are more important to mapping the color data than fidelity considerations;
    converting by the processing unit the color data from the input linear space to an output linear space by applying the color matrix of the input-device profile and the inverse color matrix of the output-device profile thereto to create color-converted color data,
        wherein, if performance considerations are more important than fidelity considerations to mapping the color data, the color matrix of the input-device profile is multiplied by the inverse color matrix of the output-device profile before being applied to the color data, the color matrix of the input-device profile and the inverse color matrix of the output-device profile being applied in a single color-conversion operation, and
        wherein, if fidelity considerations are more important than performance considerations to mapping the color data, the color matrix of the input-device profile and the inverse color matrix of the output-device profile are not concatenated and are applied in separate color-conversion operations; and
    mapping by the processing unit the inverse tone curve of the output-device profile into the color-converted color data to convert the color-converted color data into mapped color data.

2. The method of claim 1 further comprising, outputting the mapped color data to the output device.

3. The method of claim 1, wherein at least one of applying the tone curve of the input-device profile, converting the color from the input linear space to the output linear space, and mapping the inverse tone curve of the output-device profile into the color-converted color data is performed by a Graphics Processing Unit.

4. The method of claim 1, wherein at least one of applying the tone curve of the input-device profile, converting the color from the input linear space to the output linear space, and mapping the inverse tone curve of the output device profile into the color-converted color data is performed by one of a Micro-Processing Unit and a video Digital to Analog Converter of a graphics card.

5. A computer memory device storing computer-executable instructions that, when executed by a computing device, perform a method of mapping color data, which has a color associated therewith, to an output device based on an input-device profile and an output-device profile, each of the input-device profile and the output-device profile having a tone curve and a color matrix, the method comprising: receiving color data from an input device; determining that the color data is not in a linear space; applying the tone curve of the input-device profile to the color data to convert the color data into an input linear space; determining whether performance considerations are more important to mapping the color data than fidelity considerations; converting the color from the input linear space to an output linear space by applying the color matrix of the input-device profile and the inverse color matrix of the output-device profile thereto to create color-converted color data, wherein, if performance considerations are more important than fidelity considerations to mapping the color data, the color matrix of the input-device profile is multiplied by the inverse color matrix of the output-device profile before being applied to the color data, the color matrix of the input-device profile and the inverse color matrix of the output-device profile being applied in a single color-conversion operation, and wherein, if fidelity considerations are more important than performance considerations to mapping the color data, the color matrix of the input-device profile and the inverse color matrix of the output-device profile are not concatenated and are applied as separate color-conversion operations; and mapping the inverse tone curve of the output-device profile into the color-converted color data to convert the color-converted color data into mapped color data.

6. A system including one or more processing units that execute instructions stored on computer storage media to perform a method of mapping color data, which has a color associated therewith, to an output device based on an input-device profile and an output-device profile, each of the input-device profile and the output-device profile having a tone curve and a color matrix, the method comprising:
    receiving color data from an input device;
    determining that the color data is not in a linear space;
    applying the tone curve of the input-device profile to the color data to convert the color data into an input linear space;
    determining whether performance considerations are more important to mapping the color data than fidelity considerations;

converting the color from the input linear space to an output linear space by applying the color matrix of the input-device profile and the inverse color matrix of the output-device profile thereto to create color-converted color data,
    wherein, if performance considerations are more important than fidelity considerations to mapping the color data, the color matrix of the input-device profile is multiplied by the inverse color matrix of the output-device profile before being applied to the color data, the color matrix of the input-device profile and the inverse color matrix of the output-device profile being applied in a single color-conversion operation, and
    wherein, if fidelity considerations are more important than performance considerations to mapping the color data, the color matrix of the input-device profile and the inverse color matrix of the output-device profile are not concatenated and are applied as separate color-conversion operations; and
mapping the inverse tone curve of the output-device profile into the color-converted color data to convert the color-converted color data into mapped color data.

* * * * *